Aug. 15, 1933.  R. McKEE  1,922,485
ICE CREAM SHIPPING BAG
Filed June 15, 1931  2 Sheets-Sheet 1
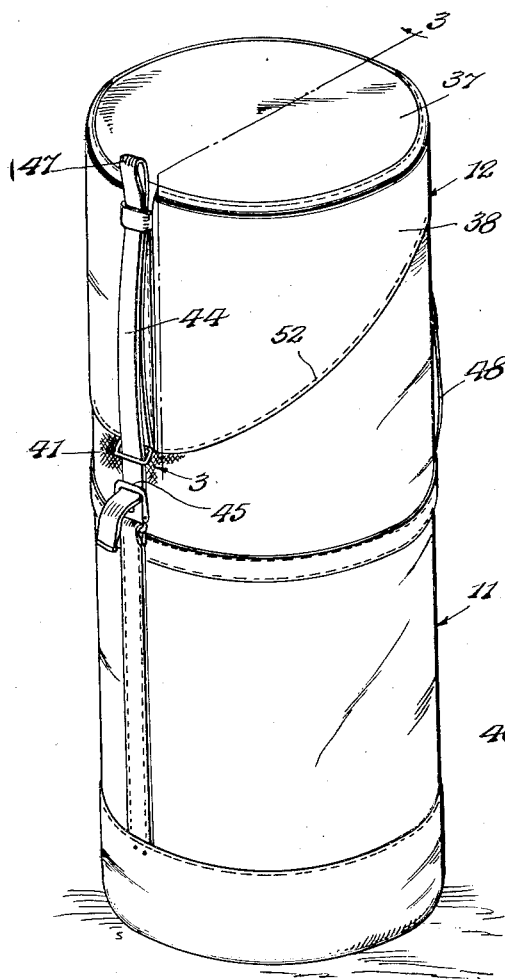
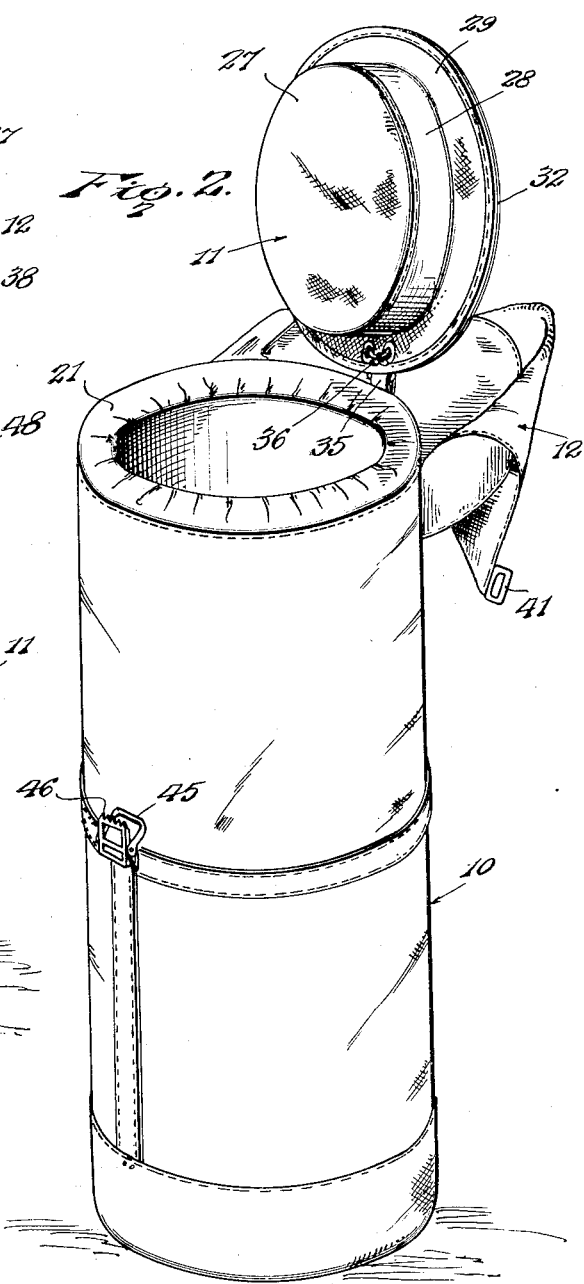
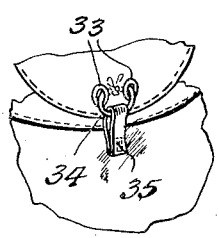
Inventor
R. McKee, deceased
by, Minerva Edith McKee.
Executrix Aug. 15, 1933.    R. McKEE    1,922,485
ICE CREAM SHIPPING BAG
Filed June 15, 1931    2 Sheets-Sheet 2
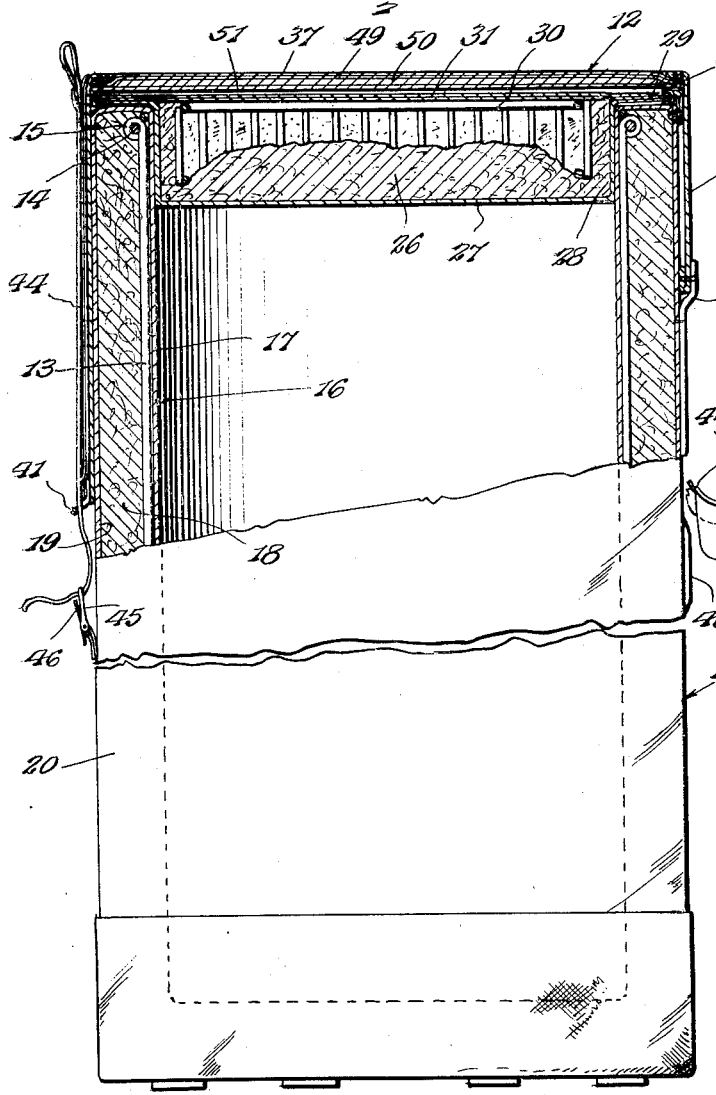
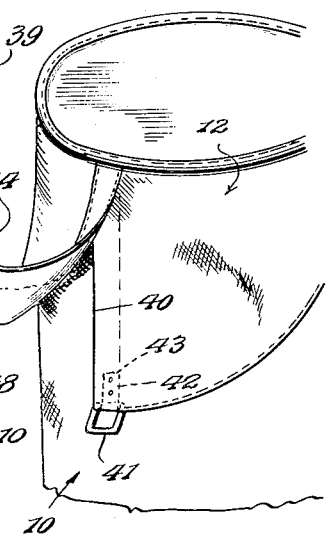
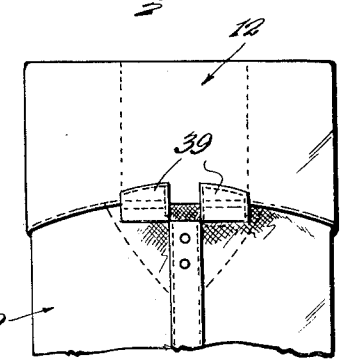
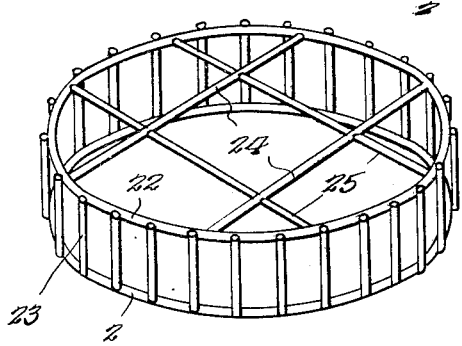
Inventor
R. McKee, deceased
by Minerva Edith McKee,
Executrix.
By Lacey & Lacey, Attorneys Patented Aug. 15, 1933

1,922,485

UNITED STATES PATENT OFFICE 1,922,485

ICE CREAM SHIPPING BAG

Ray McKee, deceased, late of Hastings, Nebr., by Minerva Edith McKee, Hastings, Nebr., executrix Application June 15, 1931. Serial No. 544,575

2 Claims. (Cl. 150—52)

This invention relates to ice cream shipping bags and has for an object to provide a light, strong insulating bag which will adequately protect and insulate the ice cream can in transit to its destination.

A further object of the invention is to provide a novel removable cover for the bag body, the cover being reinforced by an interior frame which maintains the shape of the cover so that a tight closure for the top of the bag will be maintained throughout the life of the bag.

A still further object of the invention is to provide a novel hood having a top wall which conforms to the shape of the cover and is stiffened to provide protection against wrinkling and distortion, and a skirt depending from the circular edge of the top, said skirt fitting tightly down over the body of the bag and being secured in place by a single strap and buckle whereby application and removal of the hood is readily effected.

A still further object is to provide a novel cover and hood for the shipping bag, both the cover and the hood being hinged to the body of the bag so as not to become lost therefrom, said hinges being disposed one above the other on the body of the bag so that both the cover and the hood open rearwardly and are disposed out of the way when open to permit easy insertion and removal of the ice cream can.

With the above and other objects in view the invention consists in certain novel details of construction and combinations of parts hereinafter fully described and claimed, it being understood that various modifications may be resorted to within the scope of the appended claims, without departing from the spirit or sacrificing any of the advantages of the invention.

In the accompanying drawings forming part of this specification,

Figure 1 is a perspective view of my improved ice cream shipping bag with the hood closed, Figure 2 is a perspective view of the bag with both the hood and the cover open, Figure 3 is a cross-sectional view on the line 3—3 of Figure 1, Figure 4 is a detail perspective view showing the front of the hood open preparatory to lifting the hood to full open position, Figure 5 is a detail perspective view showing the internal reinforcing frame of the cover, Figure 6 is a detail perspective view showing the hinge of the cover, Figure 7 is a detail rear elevation showing the hinge of the hood.

Referring now to the drawings in which like characters of reference designate similar parts in the various views, the body of my improved ice cream shipping bag is designated by the numeral 10, the cover by the numeral 11 and the hood by the numeral 12.

The body of the bag is preferably provided with an internal reinforcing frame formed of an annular series of vertically disposed stiff wires 13 which are connected at the top by a ring 14, the wires having suitable eyes 15 which encircle the ring and are preferably brazed or otherwise rigidly secured to the ring. The ring reinforces the body of the bag at the open top thereof and maintains the top of the bag in true circular contour throughout the life of the bag. Only the upper end of the reinforcing frame will be described in detail since the present invention is concerned specifically with the top of the bag, the cover which closes the same and the hood which seals the bag when the cover is applied.

Disposed within the reinforcing frame is an inter-lining element 16 of water-proofing material of any preferred construction and disposed within the interlining 16 is a lining 17 preferably formed of heavy canvas which is preferably paraffin treated. Disposed exteriorly of the frame is an insulating element 18 preferably formed of felt but may be formed of cork or other suitable heat insulating material. Disposed exteriorly of the heat insulating element is an outer layer of material 19 preferably formed of the same material as the inter-lining 16, and disposed exteriorly of the layer 19 is an outer cover 20 of the bag. The outer cover is preferably formed of strong heavy duck or heavy canvas to resist wear and it will be seen that the top edge portion 21 of the outer cover is turned inwardly over the ring of the frame and secured preferably by a line of stitching to the lining 17 of the bag.

By referring more specifically to Figure 5 it will be seen that the internal reinforcing frame for the cover comprises upper and lower rings 22 which are connected by vertical stiff wire 23 the ends of which are brazed or otherwise rigidly secured to the rings. A pair of spaced longitudinal braces 24 are intersected by a pair of transverse braces 25 and the ends of all of these braces are preferably brazed or otherwise rigidly secured to the uppermost ring. Preferably strong stiff wire is used to construct this frame.

By now referring to Figure 3 it will be seen that disposed within the reinforcing frame there is an element of heat insulating material 26 preferably felt, although other materials such as hair, cork and the like may be used. This element of heat insulating material is also disposed to extend exteriorly of the reinforcing frame, that is, it projects below the bottom of the frame and upwardly preferably along the sides of the frame.

The insulating material is held in place by the exterior bottom 27 and side wall 28 of the cover, the side wall being extended outwardly to provide a flange 29 which extends over the upper edge portion 21 of the body of the bag. The bottom, side wall and flange are preferably formed of strong duck or heavy canvas. A circular closure 30 preferably formed of heavy cardboard, paper or the like is disposed upon the top of the reinforcing frame and extends to the marginal edge of the flange 29. Disposed upon the closure is a circular top 31 preferably formed of heavy duck or canvas and a binding tape 32 is sewed to the marginal edge portions of the flange 29, closure 30 and top 31. The purpose of this construction is to provide a marginal flange which forms a grip which may be grasped to lift the cover out of the mouth or open top of the bag.

The cover is hinged to the body of the bag and for this purpose a pair of metallic eyes 33 are secured in the marginal flange of the cover and through these eyes a cord 34 is passed, the bight of the cord being secured in a fabric loop 35 which is securely stitched to the outer wall of the body of the bag. The ends of the cord 34 are knotted as shown at 36 in Figure 2 so that the cord may be removed to permit removal of the cover from the bag for repairs.

Referring now to Figures 1 and 2 it will be seen that the hood 12 of the bag comprises a circular top wall 37 preferably formed of strong duck or canvas and to the marginal edges of this wall there is secured a substantially cylindrical skirt 38. The rear edge portion of the skirt is hinged to the bag at the juncture of these parts, preferably by means of spaced duck or canvas tabs 39 best shown in Figure 7. The skirt is slit vertically opposite the hinges as shown at 40 in Figure 4, the edges of the slit portion overlapping. A substantially oblong metal eye 41 is secured to the lower edge of the skirt at one overlapping portion 40 thereof, the eye preferably having a lip 42 which is riveted or otherwise secured as shown at 43 to the material of the skirt. The opposite overlapping edge portion of the skirt is provided with a strap 44. The strap is adapted to be passed through the eye 41 when the skirt is applied and securely hold the overlapping edges of the skirt drawn snugly together.

The strap 44 is of greater length than the skirt and is adapted to enter a buckle 45 carried by the outer wall of the body of the bag substantially midway between the ends thereof, the buckle having the usual pivoted keeper 46 provided with a toothed edge to engage the strap and hold the hood in closed position as shown in Figure 1.

The upper end of the strap 44 is provided with a finger loop 47 and the body of the bag is provided with a handle loop 48, these loops permitting the bag being carried readily from place to place.

By referring again to Figure 3 it will be seen that underneath the top wall 37 of the hood there is disposed a circular stiffening disc 49 which is preferably glued or otherwise smoothly secured to the underneath face of the canvas top and in addition to stiffening the top holds the top against wrinkling and like distortion. Disposed underneath the stiffening disc there is a heat insulating element 50 preferably formed of felt, cork or the like and for securing this heat insulating element in place a canvas bottom wall 51 is strongly sewed at the marginal edge to the top wall 37 of the hood. Thus, the hood is insulated as well as the cover so that the ice cream container which is usually of about five gallon size will be thoroughly insulated during transit.

It will be pointed out that the bottom edge of the skirt is cut away obliquely as shown at 52 from front to rear to facilitate the hood being opened and closed.

From the above description it will be seen that the cover 11 fits snugly down into the mouth or open top of the bag and is held against distortion by the internal reinforcing frame of the cover. It will also be pointed out that the hood forms a secure closure for holding the cover in applied position, the hood being secured in place by means of a single strap and buckle which permit of rapid application and removal of the hood.

Having thus described the invention, what is claimed is:

1. A closure for insulating containers comprising, an insulated cover, said cover having internal reinforcing frames formed of stiff wire to retain the shape of the cover, said cover having a marginal flange forming a grip, a hood for retaining said cover closed, said hood comprising an insulated top adapted to bear against said cover, and a skirt depending from the marginal edge of said top, said skirt being obliquely cut away from the front edge thereof towards the rear edge thereof, a hinge for said skirt at the rear edge thereof, said skirt being slit vertically at the front portion thereof, the marginal edges of said slit portion overlapping, an eye carried by one said marginal edges, a strap carried by the other of said marginal edges passing through said eye to hold said edges overlapping, and a buckle receiving the free end of said strap whereby said hood is held firmly closed.

2. A closure for insulating containers comprising an insulating cover, an internal reinforcing frame for said cover comprising upper and lower rings connected by vertically disposed members, transverse braces secured at the ends to said upper rings, insulating material confined within said frame and extending below said frame and extending upwardly exteriorly along said vertical members, said cover having a bottom wall confining said insulating material in place, a top wall for the cover, both of said walls being formed of fabric, said bottom wall and said top wall extending laterally from the upper edge of said bag body and being secured together to form a flange which constitutes a grip for opening and closing said cover.

MINERVA EDITH McKEE. [L. S.]
*Executrix of the Last Will and Testament of Ray McKee, Deceased.*